Aug. 23, 1966    L. ALFILLE ETAL    3,268,411
CLOSURE METHOD AND MEANS FOR THE ENDS OF NUCLEAR
FUEL RODS HAVING A VERY THIN SHEATH
Filed Feb. 15, 1965    2 Sheets-Sheet 1

INVENTORS
Lucien ALFILLE
Jean-Pierre BOCQUET
Roger CHAIGNON
Aime PRAMAGGIORE
Georges VALENTIN

BY

ATTORNEYS

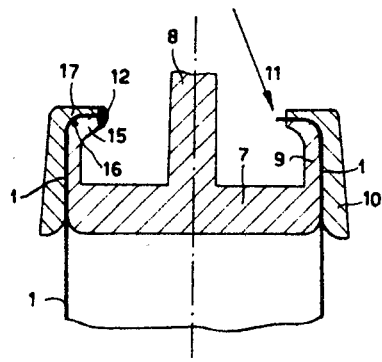
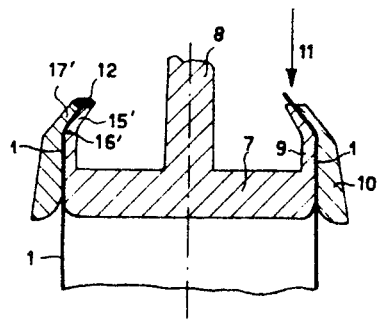
Fig 4     Fig 5
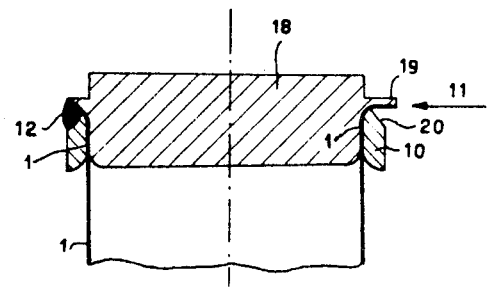
Fig 6

United States Patent Office 3,268,411
Patented August 23, 1966

3,268,411
CLOSURE METHOD AND MEANS FOR THE ENDS OF NUCLEAR FUEL RODS HAVING A VERY THIN SHEATH
Lucien Alfille, Paris, Jean-Pierre Bocquet, Chevilly-Larue, Roger Chaignon, Athis-Mons, and Aime Pramaggiore and Georges Valentin, Villejuif-Seine, France, assignors to European Atomic Energy Community-Euratom, Brussels, Belgium
Filed Feb. 15, 1965, Ser. No. 433,545
Claims priority, application Belgium, Feb. 13, 1964, 516,549
13 Claims. (Cl. 176—79)

The instant invention relates to improvements in the method and means for the closure of very thin sheaths for nuclear fuel rods by means of plugs having raised or upturned edges.

As is known in such cases, the joint between the plug and the sheath consists essentially in creating a melting zone of the parts, usually by electric arc welding or, in certain specific applications, because of the high price thereof, by electronic bombardment, and in order to improve the joint characteristics, the normal tendency is to make the raised or upturned edge of the plug of approximately the same thickness as that of the sheath to ensure uniform distribution of the heat between the parts to be welded.

In this manner, the resulting melted zone is distributed homogeneously on the sheath and on the edge of the plug, thus giving the joint increased mechanical resistance and consequently a more efficient tightness.

In known manner, the assembly is carried out by placing the rims defined by the end of the sheath and the edge of the plug at the same level, or else the rim of the sheath is made to extend beyond the edge of the plug which is provided with an annular groove for the material of the sheath to flow in during melting.

As is known, the upturned edge welding technique is very difficult of application in the case of the closing of very thin fuel rod sheaths, thinner even than 0.1 mm. Such is the case, for instance, of the fuel rod described in Belgium Patent No. 619,189, filed by the instant applicants on June 20, 1962, and bearing the title "Crayon de combustible á gaine mince souple pour réacteurs nucléaires" (Nuclear Reactor Fuel Rod Having a Thin Flexible Sheath).

This rod comprises a stainless steel sheath the thickness of which is in the order of 0.06 to 0.05 mm. The sheath has flexible deformation elements and there is a filling material between the sheath and the fuel, the filling material forming a layer which is viscous at least at the operating temperature. The sheath encloses the assembly formed by the fuel and the filling material in such a way that the assembly is stressed in all points by the sheath under hydrostatic conditions, all in such a way that by deformation of the said flexible elements the sheath takes on various configurations in adapting itself to the viscous deformation of the filling layer under thermal and mechanical stresses.

For such a sheath thickness, it is not possible to use a plug having an upturned edge the thickness of which is the same as that of the sheath because the very thin fusion zone that would be obtained by electronic bombardment would be totally inadequate to properly resist the stresses to which the joint is subjected under the operating conditions of the reactor. Consequently, such sheaths must be closed with plugs having an edge thickness substantially greater than that of the sheaths, that is, of the same order as in conventional sheaths.

These closures have the disadvantage however that they are difficult to make by reason of the impossibility of obtaining a uniform distribution of the heat thereon because of the difference in thickness of the rims to be welded. The joints thus obtained do not often have the required satisfactory mechanical strength or tightness, resulting in numerous rejects in mass production as well as in a high production cost.

In the case of electric arc welding such as argon-arc, in fact, the heat absorption capacity of the plug being too great in relation to that of the end of the sheath, the latter tends to break down by fusion before the edge of the plug reaches fusion temperature and in order to obtain the weld, it becomes necessary to cool the sheath.

Welding by electronic bombardment, because of the extreme concentration of the energy beam, makes it possible to assemble a thick plug and a thin sheath while avoiding the use of such auxiliary means. However, the cost of such welding, substantially greater than that of electric arc welding, considerably affects the cost of the operation from the point of view of industrial production. Besides, it requires exacting working conditions which, by ensuring that the heat is concentrated on the edge of the plug to avoid breakdown of the sheath, result in a better distribution of the heat between the two rims.

Furthermore and independently of the type of welding used, in order to ensure that the joint has good mechanical qualities, it is generally necessary to provide a second joint between the plug and the sheath.

This is namely the case of the fuel rod described in the above-mentioned Belgian patent where the upstanding edge of the plug is spot welded to the sheath because of the particular operating conditions of the sheath that substantially affect the mechanical quality of the weld, be it made by electric arc or by electronic bombardment.

The pressurized viscous filling material between the sheath and fuel may seep, under the action of the external hydrostatic pressure of the heat-carrying fluid, between the sheath and the upstanding edge of the plug and subject the weld to a powerful stress that increases the possibility of a tightness failure.

The object of the present invention lies in the provision of a closure for a nuclear fuel rod having a sheath of a thickness smaller than 0.1 mm., the closure comprising means to join such a sheath to plugs having an upturned edge of a thickness much greater than that of the sheath, either by electric arc welding or by electronic bombardment while eliminating the present disadvantages met in the application of these methods, such means also preserving the mechanical quality and the tightness of the joint in all conditions of operation of the sheath.

The main purpose of the invention is to produce such a closure for a fuel rod having a thin sheath and particularly for a rod such as described in the above-mentioned Belgian Patent No. 619,189 wherein there is provided a ring or ferrule for securing the sheath to the plug, the said ring welded on one side to the ends of the sheath and of the upstanding edge of the plug, whereby to limit during welding the ill effects of the fusion heat on the sheath and, by the binding action of the ring or ferrule, to ensure the good mechanical qualities and tightness of the weld.

Another object of the invention is to provide for such a closure, a shape for the ring and the edge of the plug such as to allow the welded ends to increase their resistance to mechanical stresses during operation in the reactor.

Another object of the invention is to provide such a closure wherein the shape of the ring and of the edge of the plug is such as to lock the sheath against axial displacement.

The closure means is characterized by a securing ferrule for the sheath having an end the thickness of which is at least equal to the thickness of the end of the upturned edge of the plug, the ferrule being simultaneously welded to the ends of the sheath and of the upturned edge.

According to another feature of the invention, the securing ferrule of the sheath is of a height equal to the full height of the plug inserted in the sheath.

Another feature of the invention resides in that the securing ferrule and the upstanding edge of the plug have, at least in the portion closest to the welded ends, a thickness which increases from the welded ends.

According to a further feature of the invention, at least a portion of the terminal part of the sheath that is locked between the ferrule and the plug edge is deformed outwardly or inwardly and the ferrule and the plug edge have a shape such as to adapt itself to the deformed part of the sheath.

Further details and other features of the invention will become apparent from the description that follows having reference to the appended drawing wherein:

FIGS. 3, 4 and 5 are longitudinal cross-sectional views of closure means according to the instant invention including axial locking means for the sheath, and FIG. 6 is an example of the application of the closure of the invention to lateral welding.

In all the above-noted figures, the right hand section illustrates the closure after assembly whereas the left hand section shows the closure after welding.

Figure 1:
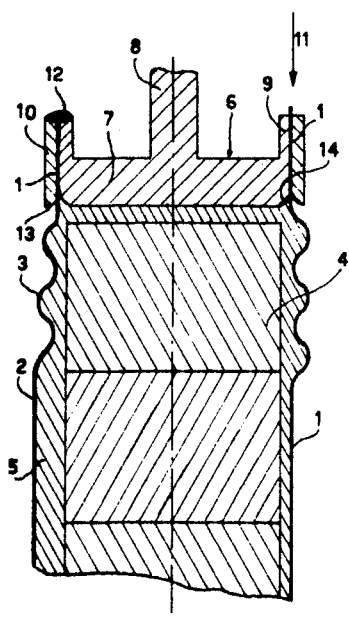
FIG. 1 is a longitudinal cross-sectional view of the end of a fuel rod closed according to the teaching of the instant invention.

Referring now to FIG. 1, illustrating a fuel rod having a flexible thin sheath in accordance with Belgian Patent No. 619,189, 1 is the sheath having a thickness of 0.05 to 0.1 mm. and provided with folds 2 and 3 respectively allowing radial and axial deformations, 4 are the fuel pellets stacked in the sheath; 5 is the viscous metallic layer surrounding the fuel pellets 4 and 6 is the plug having a bottom 7 provided at the end of a central lug 8 serving for the securement of the rod to the bracing structure (not shown) of the cluster. Peripherally of the bottom 7 is the raised or out-turned edge 9 having a thickness in the order of 0.5 to 1 mm. that is necessary to obtain, by welding, the connection with the thin sheath.

According to the invention, an annular ferrule 10 is mounted on sheath 1 in correspondence with plug 6 and arranged in such a manner that the sheath 1 extends beyond the end of the edge 9; the annular ferrule 10 having a height equal to plug 6 and the same thickness as the upturned edge 9.

A melted zone 12, which joins plug 6 and ferrule 10 to sheath 1, is produced by welding carried out by pointing the thermal source, indicated schematically by numeral 11, on the portion of the sheath extending beyond the ends of edge 9 and ferrule 10.

During welding, the presence of ferrule 10 which binds the sheath against the plug, makes it possible to practically limit the fusion zone to the upper end of the sheath which is contained between the ferrule and the upturned edge of the plug and to avoid overheating of the sheath; the local heating caused by the fusion being capable of creating a temperature gradient in radial direction on the two faces of the sheath so as to cause a heating which is progressively attenuated in axial direction when moving away from the ends of edge 9 and ferrule 10 to be joined.

Once the closure is made, ferrule 10 by its location provides securement of the thin sheath to the plug whereby to prevent viscous metal 5 under pressure by the action of the external hydrostatic pressure to flow along the plug and the thin sheath, thus preventing the sheath from disengaging from the plug following infiltration of the metal. This arrangement makes it possible to prevent the welded zone 12 from being subjected to any stresses thus providing an efficient tightness.

As can be seen in the drawing, the base of ferrule 10 and the edge of bottom 7 of plug 6 each have an angular junction respectively formed by beads 13 and 14 which prevent the sheath from being cut or broken during swelling thereof under stress.

Figure 2:
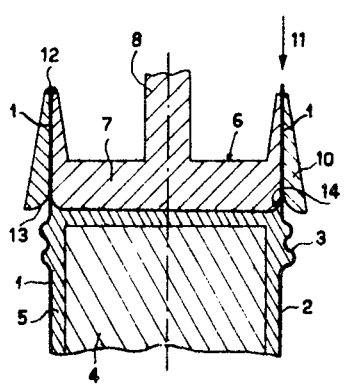
FIG. 2 is a longitudinal cross-sectional view of another embodiment of the invention.

According to the embodiment illustrated in FIG. 2, the base of ferrule 10 and that of upturned edge 9 of the plug are thickened to define an outer conical profile of equal apex angle.

With this arrangement, it is possible to obtain a greater resisting section at the location where sheath 1 projects from the bottom 7 of the plug 6 to thus strengthen the joined ends whereby they may resist the stresses induced by the hydrostatic pressure acting toward the weld and to provide around the sheath, either above bottom 7 or corresponding thereto, a more important mass intended to further attenuate the effect of the heat in axial direction on the sheath during welding.

Figure 3:
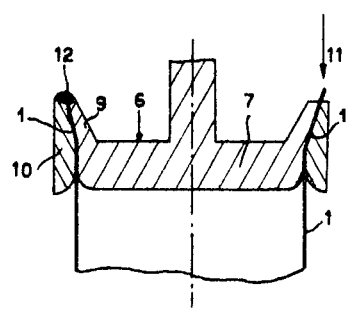

To avoid that weld 12 be subjected to mechanical tensile stresses, a positive anchorage of the sheath is obtained, as is illustrated in FIGS. 3, 4 and 5, by deforming the end of the sheath and locking it between complementary surfaces of the ferrule 10 and upturned edge 9, these surfaces being inclined in relation to the axis of the rod.

In accordance with the embodiment illustrated in FIG. 3, the raised edge 9 of the plug having a conical outline is inclined outwardly to define a conical flaring whereas the cylindrical ferrule 10 is flared inwardly to complement the flaring of edge 9.

Deformation of the sheath, of the expanded type, is obtained when the plug is introduced in the sheath during assembly.

The ferrule 10 is disposed around the sheath before the plug is mounted into position to cause flaring of the sheath, ferrule 10 being pulled axially upwardly thereafter to ensure securement of the sheath against the cone of the plug.

FIGS. 4 and 5 illustrate the application of this method comprising axial locking of the sheath between the ferrule and the plug, to the embodiments of FIGS. 1 and 2.

As can be derived from the drawing, according to the embodiments of FIGS. 4 and 5, the upturned edge 9 of the plug comprises a flange 15, 15' joined to the upturned edge 9 by a curved junction 16 whereby to allow inward folding of sheath 1 by plastic deformation, and ferrule 10 comprises an upper flange 17, 17' locking the folded end of the sheath. This method makes it possible to increase the quality of the weld and its resistance to mechanical as well as thermal stresses in general, particularly when, as is the case in the fuel rod of FIG. 1, the viscous layer which has become too fluid following the elevation of temperature, may filter between the sheath and the plug.

According to the embodiment of FIG. 4, the flanges 15 and 17 are horizontal to thus obtain a 90° fold of the sheath. On the other hand, in the embodiment of FIG. 5, the flanges 15' and 17' are equally inclined but to a lesser degree whereby to obtain a less pronounced fold, in the order of 45°. The advantage with the embodiment shown in FIG. 5 is that the weld may be made with the electrode 11 positioned axially whereby in the embodiment of FIG. 4, the electrode 11 must be maintained at an angle in relation to the axis of the rod.

As can be derived from FIG. 6, closure according to the invention may apply equally well to particular types of sheathed tubes for which the use of a massive plug 18 through which thermo-couples must extend, for instance, makes it necessary to resort to lateral welding of the sheath to a turned edge formed by a lateral flange 19.

According to the invention, flange 19 is provided with a curved junction such as to allow flaring of the sheath, ferrule 10 also having a curved junction corresponding to that of the flange and, outwardly thereof, having a chamfered edge 20 adapted for the reception of the melt from flange 19 defining the weld.

We claim:
1. A method of closing an end of a nuclear rod having an outer thin flexible sheath into which nuclear fuel is inserted, comprising the steps of:
   (a) inserting the fuel in the sheath so that one end of the sheath extends beyond one end of the fuel;
   (b) inserting in said end of the sheath and over said fuel a metal plug having a peripheral outwardly raised edge until said sheath projects from the edge of said plug;
   (c) mounting a ferrule around said end of said sheath in correspondence with said edge of said plug whereby said sheath extends beyond both said plug edge and ferrule, and
   (d) heating said extending end of said sheath and the adjoining parts of said ferrule and edge to weld said sheath, ferrule and plug together;
   (e) the thickness of said edge and ferrule being substantially greater than that of said sheath whereby a portion of the welding heat may be dissipated in the ferrule and edge which is sufficient to prevent break-down of the sheath.

2. A method as claimed in claim 1, wherein the thickness of the ferrule is at least as great as that of the edge.

3. Closing means for an end of a nuclear fuel rod having a thin sheath, generally thinner than 0.1 mm., and a plug in one end of said sheath for closing said end, said plug formed peripherally thereof with an outwardly turned raised edge for overlap welding with said sheath, said edge of a thickness essentially greater than the thickness of said sheath, characterized by
   a securing ferrule mounted outwardly of said one end of said sheath and having an extremity of a thickness at least as great as that of the corresponding extremity of the raised edge; the extremities of the ferrule, sheath and raised edge being welded together.

4. Closing means as claimed in claim 3, wherein the height of the ferrule is equal to that portion of the plug inserted in the sheath.

5. Closing means as claimed in claim 3, wherein said ferrule is cylindrical.

6. Closing means as claimed in claim 3, wherein said ferrule and said raised edge have, at least in the corresponding part closest to the welded ends, a thickness which increases from said welded ends.

7. Closing means as claimed in claim 3, wherein said ferrule and said edge have a cross-sectional conical outline of equal apex angle.

8. Closing means as claimed in claim 3, wherein at least a portion of the end of said sheath comprised between said ferrule and raised edge is deformed radially, and cooperating surface means on said ferrule and on said raised edge to clamp said deformed end of said sheath therebetween.

9. Closing means as claimed in claim 8, wherein said ferrule is cylindrical, the surface means thereof is a conical flaring surface and the raised edge surface means is a corresponding conical flaring surface.

10. Closing means as claimed in claim 8, wherein said cooperating surface means are defined on inwardly directed flanges, one on said ferrule and one on said edge.

11. Closing means as claimed in claim 3, wherein the other extremities of said ferrule and raised edge have curved surfaces, joining with the faces of the sheath in contact with said ferrule and raised edge, of equal radii of curvature.

12. In closing means for an end of a nuclear fuel rod, the combination comprising:
   (a) an outer thin sheath;
   (b) a plug fitted in one end of said sheath to close said end and formed of a peripheral raised edge outwardly turned to terminate generally at the tip of said sheath; said edge essentially thicker than said sheath;
   (c) a securing ferrule mounted outwardly around said end of said sheath in correspondence with said raised edge; the tip of said ferrule being at least as thick as the tip of said edge;
   (d) a weld joining the tips of said ferrule, sheath and edge together, and wherein
   (e) the thickness of the tips of said edge and said ferrule is substantially greater than that of said sheath to the extent that a portion of the welding heat may dissipate therein which is sufficient to prevent break-down of the sheath.

13. A combination as claimed in claim 12, wherein the thickness of said sheath is less than 0.1 mm.

References Cited by the Examiner

UNITED STATES PATENTS

| | | | |
|---|---|---|---|
| 3,118,819 | 1/1964 | Alfille et al. | 176—79 |
| 3,222,256 | 12/1965 | Fletcher et al. | 176—79 |

FOREIGN PATENTS

| | | |
|---|---|---|
| 848,723 | 9/1960 | Great Britain. |
| 108,375 | 10/1958 | Pakistan. |

BENJAMIN R. PADGETT, *Acting Primary Examiner.*

CARL D. QUARFORTH, *Examiner.*

M. J. SCOLNICK, *Assistant Examiner.*